No. 639,408. Patented Dec. 19, 1899.
J. LA BURT.
BICYCLE BRAKE.
(Application filed Feb. 20, 1899.)
(No Model.) 3 Sheets—Sheet 2.

WITNESSES
C. W. Benjamin
Chester H. Higgins

INVENTOR
John La Burt
BY
William R. Baird
ATTORNEY

No. 639,408.   Patented Dec. 19, 1899.
J. LA BURT.
BICYCLE BRAKE.
(Application filed Feb. 20, 1899.)
(No Model.) 3 Sheets—Sheet 3.

WITNESSES
C. W. Benjamin
Chester H. Higgins

INVENTOR
John La Burt
BY
William R. Baird
ATTORNEY

UNITED STATES PATENT OFFICE.

JOHN LA BURT, OF NEW YORK, N. Y.

BICYCLE-BRAKE.

SPECIFICATION forming part of Letters Patent No. 639,408, dated December 19, 1899.

Application filed February 20, 1899. Serial No. 706,146. (No model.)

*To all whom it may concern:*

Be it known that I, JOHN LA BURT, a citizen of the United States, residing in New York, (Jamaica,) Queens county, New York, have invented new and useful Improvements in Bicycle-Brakes, of which the following is a specification.

My invention relates to brakes for bicycles, and has for its object the production of a simple and efficient brake which may be quickly attached to many different patterns of wheels, which will in operation produce but a small amount of wear upon the tire against which it is applied, which will not wear out the brake-shoe, and which is light and cheap. Its novelty consists in the construction and adaptation of the parts, which will be more particularly hereinafter pointed out.

Figure 1:
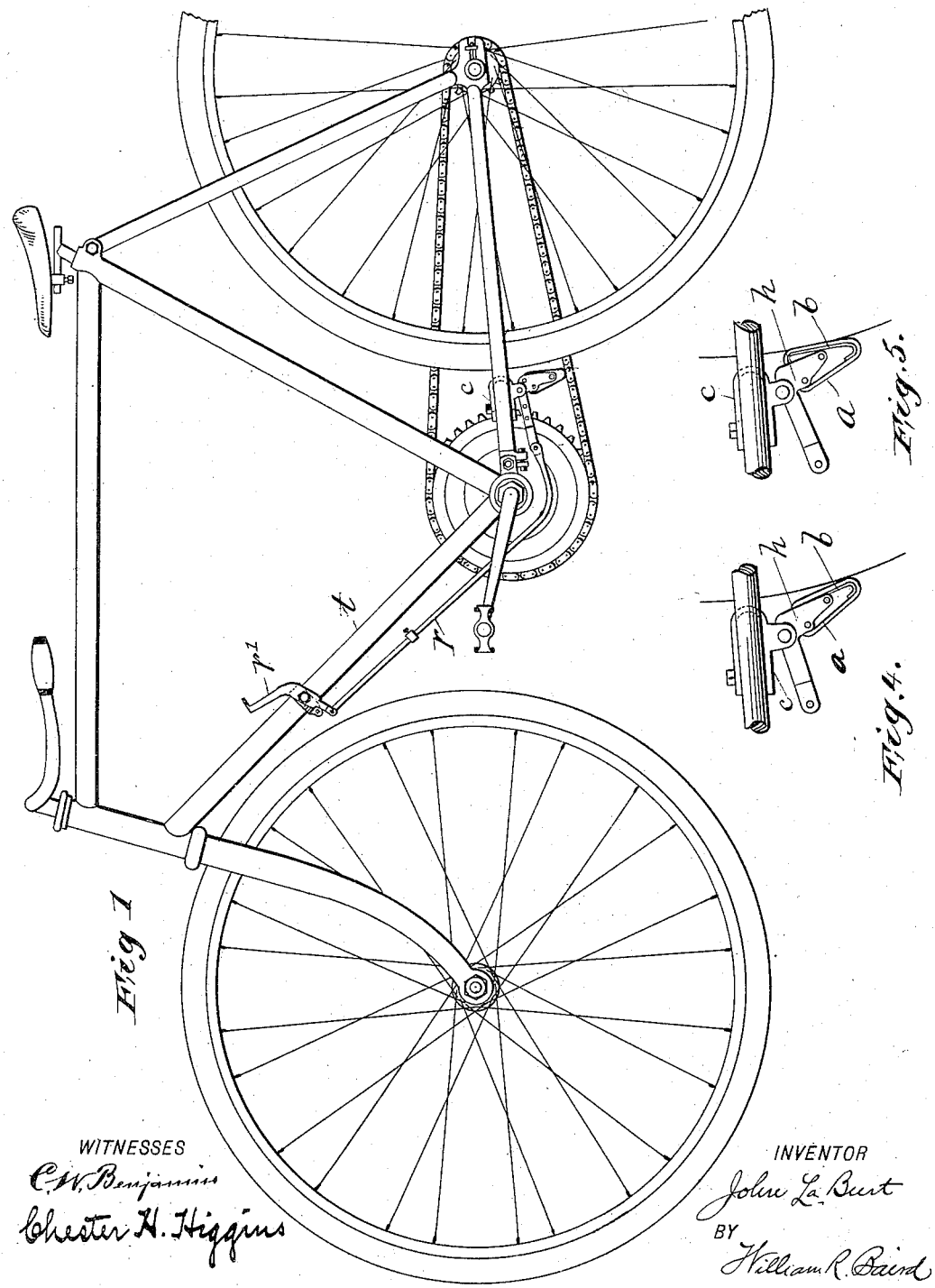
Figure 2:
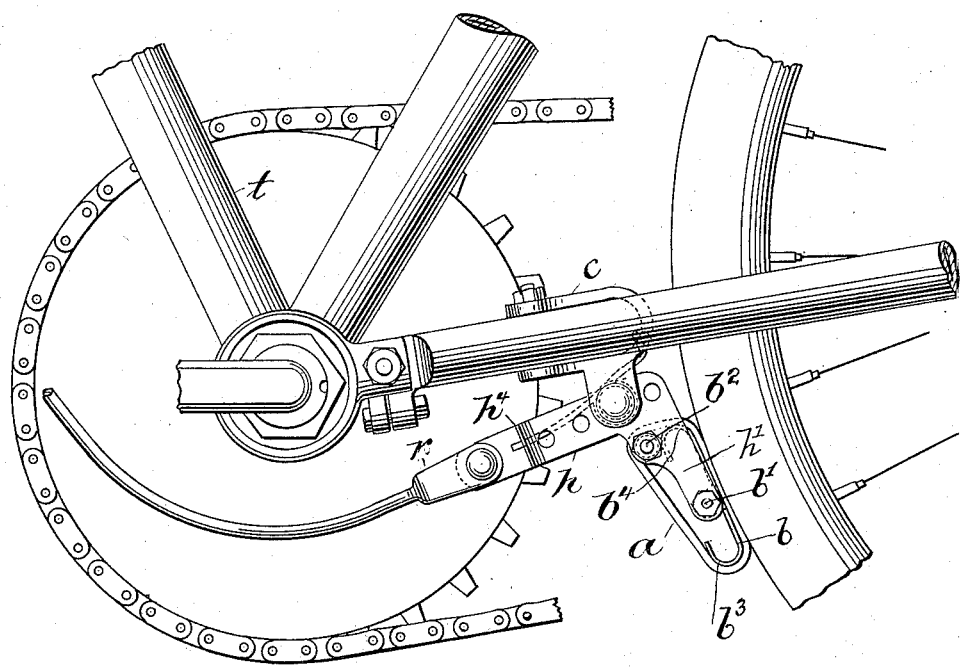
Figure 3:
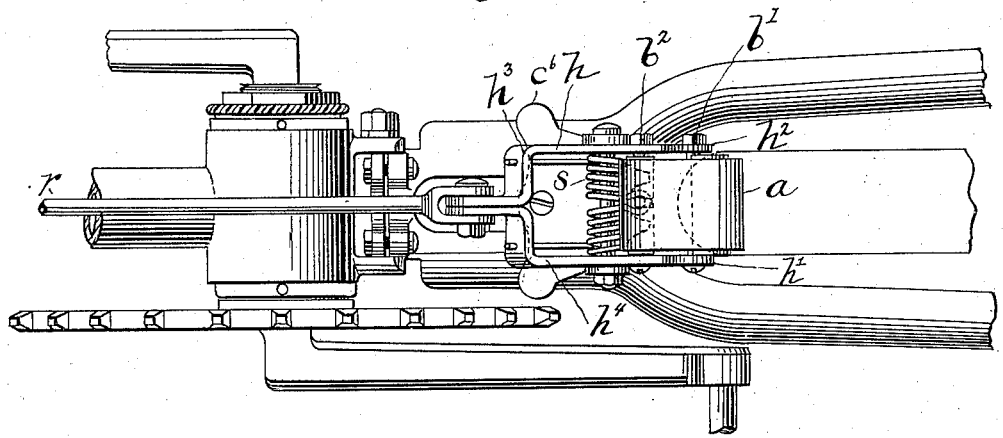
Figure 11:
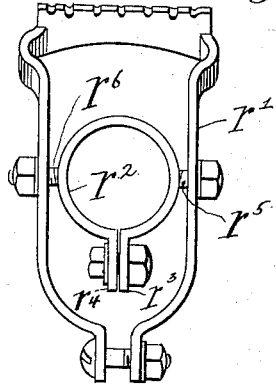
Figure 6:
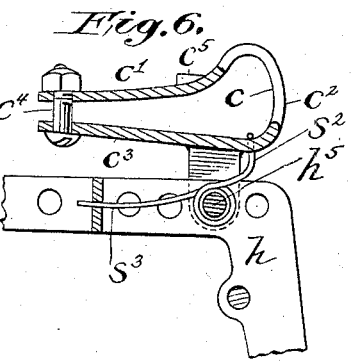
Figure 7:
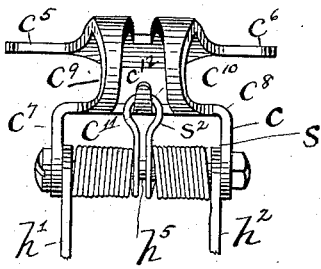
Figure 8:
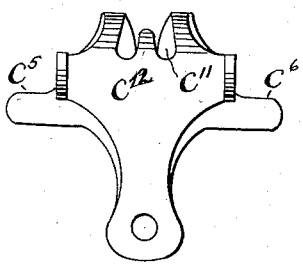
Figure 10:
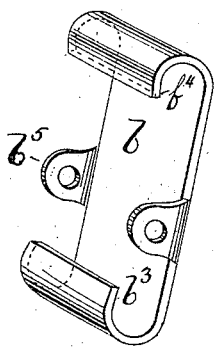
Figure 12:
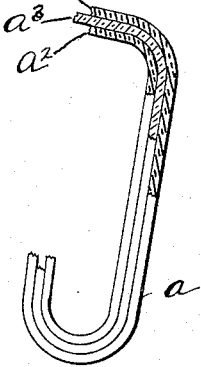
Figure 9:
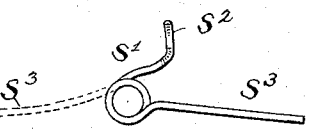

In the drawings, Figure 1 is a side elevation of a wheel equipped with my improved brake and designed to operate upon the rear wheel. Fig. 2 is a similar but enlarged view of the brake and its connections, and Fig. 3 is a bottom plan view of the same. Figs. 4 and 5 are small detail views showing the brake in different positions during its operation. Fig. 6 is a partial vertical section and side elevation of the clip; and Fig. 7 a rear elevation, and Fig. 8 a bottom plan view, of the same. Fig. 9 is a side view of the spring before it is placed in position. Fig. 10 is a perspective view of the friction-plate. Fig. 11 is a rear elevation of the foot-lever of the brake-rod and its support, and Fig. 12 is a central vertical section of a portion of the brake-band.

The brake consists, essentially, of an endless elastic band $a$, adapted to be passed around a friction-plate $b$, pivotally hinged upon a pintle $b'$, supported by and between the dependent members $h'$ and $h^2$ of a hanger $h$, which also supports and carries a rod or roller $b^2$, parallel with the pintle $b'$ and at right angles to the medial line of the endless band $a$, which also passes around it.

I provide the friction-plate $b$ with inturned ends $b^3$ and $b^4$ and with a lug $b^5$ on each side, through which the pintle $b'$ passes. The inturned ends are simply to make the change of direction of the band $a$ less abrupt. The pintle $b'$ should be placed at a point below the transverse medial axis of the friction-plate $b$. Otherwise when the plate is caused to swing around it, in the manner presently to be described, its upper extremity would tend to swing forward away from the rear wheel rather than backward toward it.

The endless band $a$ is made of any suitable elastic material; but the construction which I prefer is to make it of two external strips $a'$ and $a^2$ of soft rubber, and interposed between them is placed a strip or band $a^3$ of less elastic material.

The dependent members $h'$ and $h^2$ of the hanger $h$ are continued upward and horizontally, being curved inward at $h^3$ and $h^4$ until they are brought into contact with each other and both pivotally bolted to the brake-rod $r$. This rod is curved downward and then upward, its other extremity being pivoted to a lever $r'$, mounted at any convenient place on the frame. The manner of mounting this lever is as follows: I clamp around the tube $t$ of the frame at any chosen point a collar $r^2$, terminating at its bottom in two flanges $r^3$ and $r^4$, which being bolted together in the usual manner are thus securely held to the tube of the frame. This collar is provided laterally with two substantially horizontal trunnions $r^5$ and $r^6$, upon which the foot-lever $r'$ is hung and swings. The foot-lever is provided with suitable apertures to receive the trunnions $r^5$ and $r^6$ and at the bottom is bolted or otherwise pivotally connected to the brake-rod $r$. By this construction I am enabled to locate the foot-lever at any point on the tube without altering the latter in any manner. The members of the hanger $h^4$ and $h^3$ are each provided with oppositely-disposed apertures adapted to receive a bolt $h^5$, by which the hanger is attached to a supporting-clip $c$, fastened to the frame of the machine. The series of holes permits of the adjustment of the hanger at different positions with relation to the wheel.

The supporting-clip is made in one piece. It has an upper member $c'$, a curved rear member $c^2$, and a lower member $c^3$. The upper and lower members are adapted to embrace a portion of the frame of the machine and are secured together by a nut and bolt $c^4$. The upper member is provided with two projecting wings or flanges $c^5$ and $c^6$, which afford a wide bearing-surface against the frame of the machine. The lower member is provided with two ears or lugs $c^7$ and $c^8$, between which the bolt $h^5$ of the hanger is attached. The curved rear member is made in two parts $c^9$ and $c^{10}$, with an opening $c^{11}$ between them. Within this opening is placed a projecting lug or stud $c^{12}$, cut from a portion of the clip and bent backward.

A spring $s$ is designed normally to hold the brake-band away from the rear wheel. This spring is adapted to be coiled around the bolt $h^5$. It has a central uncoiled portion $s'$ extending upward to form a loop $s^2$, adapted to be placed over the stud or lug $c^{12}$. From the center it is wound in opposite directions toward the ends of the bolt, and the free ends $s^3$ and $s^4$ are bent over and forward until they are caught against, rest upon, or pass through the members of the hanger, and are thus held under a tension. The position of the clip being fixed, the action of the spring $s$ is to throw the hanger, and consequently the brake-band, forward and away from the rear wheel.

The method of operating the brake is as follows: The foot-lever $r'$ being pressed forward at the top by the foot or in any other suitable manner, it turns upon its bearings upon the collar $r^2$ and the brake-rod $r$ is pushed downward and rearward. This action communicates a backward-and-downward movement to the hanger $b$ and causes it to swing upon the bolt $h^5$. This being the case, its lower end carrying the endless band $a$ is moved toward the rear wheel, as shown in Fig. 4. When the band $a$ comes into actual contact with the wheel, if the pressure on the brake-rod $r$, and consequently the rotation of the hanger $h$, continues the lower end of the band being unable to move farther by reason of its contact with the wheel a secondary rotation of the friction-plate $b$ on the pintle $b'$ takes place, the upper end of the friction-plate being then thrust toward the rear wheel and the band $a$ consequently comes into contact with the rear wheel over a greater surface, as shown in Fig. 5, the band then being stretched backward from the roller $b^2$. The extent of the contact is sufficient to effectually stop the rotation of the wheel. As the endless band is free to slide around the friction-plate and roller, the contact with the wheel is not harsh or sudden, and the tendency to injure the tire is much less than when a rigid brake-shoe is employed. The roller $b^2$ limits the forward motion of the friction-plate and serves as a stop.

What I claim as new is—

1. A bicycle-brake consisting of a hanger, a friction-plate inturned at its upper and lower extremities, and hinged to swing upon the hanger by means of a pintle placed intermediate the transverse center line of the plate and its lower inturned extremity, and an endless band adapted to pass around said plate in contact with the extremities of the same.

2. In a bicycle-brake the combination of a hanger consisting of two members turned toward each other and in contact during a portion of their length and provided with a series of oppositely-arranged apertures adapted to receive bolts whereby it may be adjustably secured to a supporting-clip mounted on the frame of the machine, said clip, and an endless brake-band adapted to be supported upon the hanger.

3. A bicycle-brake consisting of a hanger, a friction-plate inturned at its upper and lower extremities and hinged to swing upon the hanger by means of a pintle placed immediately below the transverse central line of the plate, a rod or roller supported by the hanger and placed in front of the upper inturned end of the plate and an endless band adapted to pass around said plate and rod.

4. In a bicycle-brake the combination with the brake-hanger of a supporting-clip therefor made in one piece and adapted to be bolted to the frame of the machine, provided with flanges adapted to rest upon the frame, dependent lugs to which the hanger is attached, and a lug formed from the rear of the clip by cutting and bending back a portion thereof and a coiled spring supported upon and restrained by the front of the hanger and adapted to hook on said rear lug.

In witness whereof I have hereunto set my hand in the presence of two subscribing witnesses.

JOHN LA BURT.

Witnesses:
HERMAN MEYER,
CHESTER H. HIGGINS.